United States Patent
Taylor et al.

(10) Patent No.: US 7,630,697 B2
(45) Date of Patent: Dec. 8, 2009

(54) LOCAL OSCILLATOR CONTROL IN RADIO RECEIVERS

(75) Inventors: Stewart S. Taylor, Beaverton, OR (US); Jing-Hong C Zhan, HsinChu (TW); Brent Carlton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 11/714,307

(22) Filed: Mar. 6, 2007

(65) Prior Publication Data
US 2008/0219329 A1 Sep. 11, 2008

(51) Int. Cl.
*H04B 1/26* (2006.01)
(52) U.S. Cl. ...................... 455/255; 455/317

(58) Field of Classification Search .................. 455/131, 455/226.1, 226.3, 255–257, 260, 264, 313, 455/316–318; 375/344, 355, 356; 327/122
See application file for complete search history.

(56) References Cited

U.S. PATENT DOCUMENTS

2008/0032646 A1 * 2/2008 Huang et al. ................. 455/131
2008/0136468 A1 * 6/2008 Li et al. ....................... 327/122

* cited by examiner

*Primary Examiner*—Thanh C Le
(74) *Attorney, Agent, or Firm*—Dana B. Lemoine; Lemoine Patent Services, PLLC

(57) ABSTRACT

A radio receiver measures a signal quality metric and modifies attributes of a local oscillator signal in response thereto. A digital signal processor may be used to determine a signal-to-noise-plus-distortion ratio (SNDR) of a baseband signal, and the overlap of two quadrature-related local oscillator signals may be modified.

15 Claims, 3 Drawing Sheets

LOCAL OSCILLATOR CONTROL IN RADIO RECEIVERS

FIELD

The present invention relates generally to radio receiver circuits, and more specifically to radio receiver circuits with reduced distortion.

BACKGROUND

Many radio receivers utilize in-phase and quadrature local oscillator signals to downconvert a received signal. The performance of the radio receiver may depend in part on the characteristics of the local oscillator signals. For example, the Noise Figure (NF) or linearity of a radio receiver may be dependent, at least in part, on the characteristics of the local oscillator signals.

DESCRIPTION OF EMBODIMENTS

Figure 1:
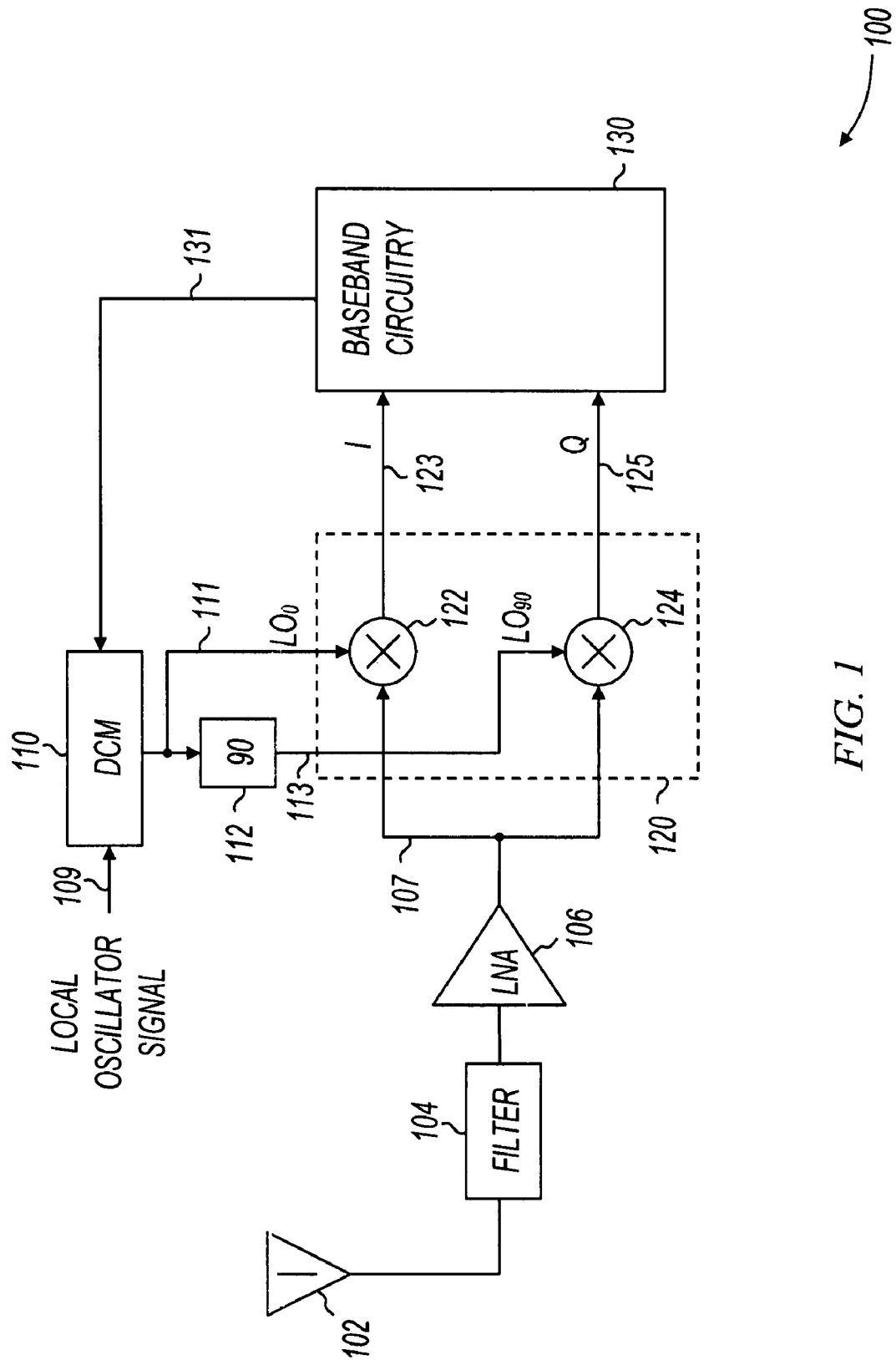
FIGS. 1 and 2 show diagrams of radio receivers in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a radio receiver in accordance with various embodiments of the present invention. Radio receiver 100 includes antenna 102, preselect filter 104, low noise amplifier (LNA) 106, mixer circuit 120, duty cycle modulation circuit (DCM) 110, phase shifter 112, and baseband circuitry 130.

In operation, antenna 102 receives radio frequency (RF) signals to be processed by the remaining circuitry of radio receiver 100. Antenna 102 may include one or more antennas. For example, antenna 102 may include a single directional antenna or an omni-directional antenna. As used herein, the term omni-directional antenna refers to any antenna having a substantially uniform pattern in at least one plane. For example, in some embodiments, antenna 102 may include a single omni-directional antenna such as a dipole antenna, or a quarter wave antenna. Also for example, in some embodiments, antenna 102 may include a single directional antenna such as a parabolic dish antenna or a Yagi antenna. In still further embodiments, antenna 102 may include multiple physical antennas. For example, in some embodiments, multiple antennas are utilized for multiple-input-multiple-output (MIMO) processing or spatial-division multiple access (SDMA) processing.

Radio frequency signals are provided to preselect filter 104 by antenna 102. Preselect filter 104 passes signals in a preselected band of RF frequencies to LNA 106. In some embodiments, preselect filter 104 is omitted. LNA 106 amplifies the preselected band of signals, and passes them to mixer circuit 120 on node 107.

Mixer circuit 120 includes two mixers to downconvert an in-phase signal component and a quadrature signal component. Mixer circuit 120 may include passive or active mixers. Mixer 122 receives an RF signal on node 107 and an in-phase local oscillator signal ($LO_0$) on node 111, and produces a lower frequency in-phase (I) signal on node 123. Mixer 124 receives an RF signal on node 107 and a quadrature local oscillator signal ($LO_{90}$) on node 113, and produces a lower frequency quadrature signal (Q) on node 125.

The I and Q signals produced by mixer circuit 120 may be at any frequency. For example, in some embodiments, mixer circuit 120 downconverts from RF to an intermediate frequency (IF), and in other embodiments, mixer circuit 120 downconverts from RF to a baseband frequency. The remaining figures are described with respect to baseband embodiments, although the various embodiments of the invention are not so limited.

A local oscillator signal (LO) is provided to radio receiver 100 on node 109. Duty cycle modulation circuit (DCM) 110 receives the LO signal and provides the in-phase LO signal to mixer circuit 120. DCM 110 also provides the in-phase LO signal to phase shifter 112. Phase shifter 112 shifts the phase of the in-phase LO signal by 90 degrees to produce the quadrature LO signal. DCM 110 modifies the duty cycle of the local oscillator signal in response to control information provided by baseband circuitry 130 on node 131. Duty cycle modification of the LO signal is described more fully below.

Duty cycle modification may be performed by DCM circuit 110 in many different ways. For example, DCM circuit 110 may include series of programmable delay stages, delay stages and logic, or any other combination. The manner in which duty cycle modulation is achieved is not a limitation of the present invention.

Baseband circuitry 130 receives the I and Q signals from mixer circuit 120 and performs baseband processing. In some embodiments, baseband circuitry 130 includes analog circuitry and digital circuitry, and in some embodiments, baseband circuitry 130 includes only analog circuitry. Baseband circuitry 130 generates a control signal on node 131 in response to a signal quality measure. For example, the control signal on node 131 may be related to a signal amplitude, a signal phase, a signal to noise ratio, or any other signal quality measure. The control signal on node 131 may be analog or digital, and may include one or more conductors. The duty cycle of the LO is modified in response to the control signal on node 131, and is therefore modified in response to the value of the signal quality measure.

In some embodiments, the duty cycle of the local oscillator signal is controlled to achieve non-overlapping in-phase and quadrature LO signals while maintaining a large LO overdrive voltage. If the LO phases overlap, the noise figure (NF) is generally worse. If the overdrive voltage of the mixer transistors is small, the linearity is worse. The various embodiments of the present invention can improve NF with increased linearity by modifying the duty cycle of a local oscillator signal to provide non-overlapping in-phase and quadrature LO signals.

Figure 2:
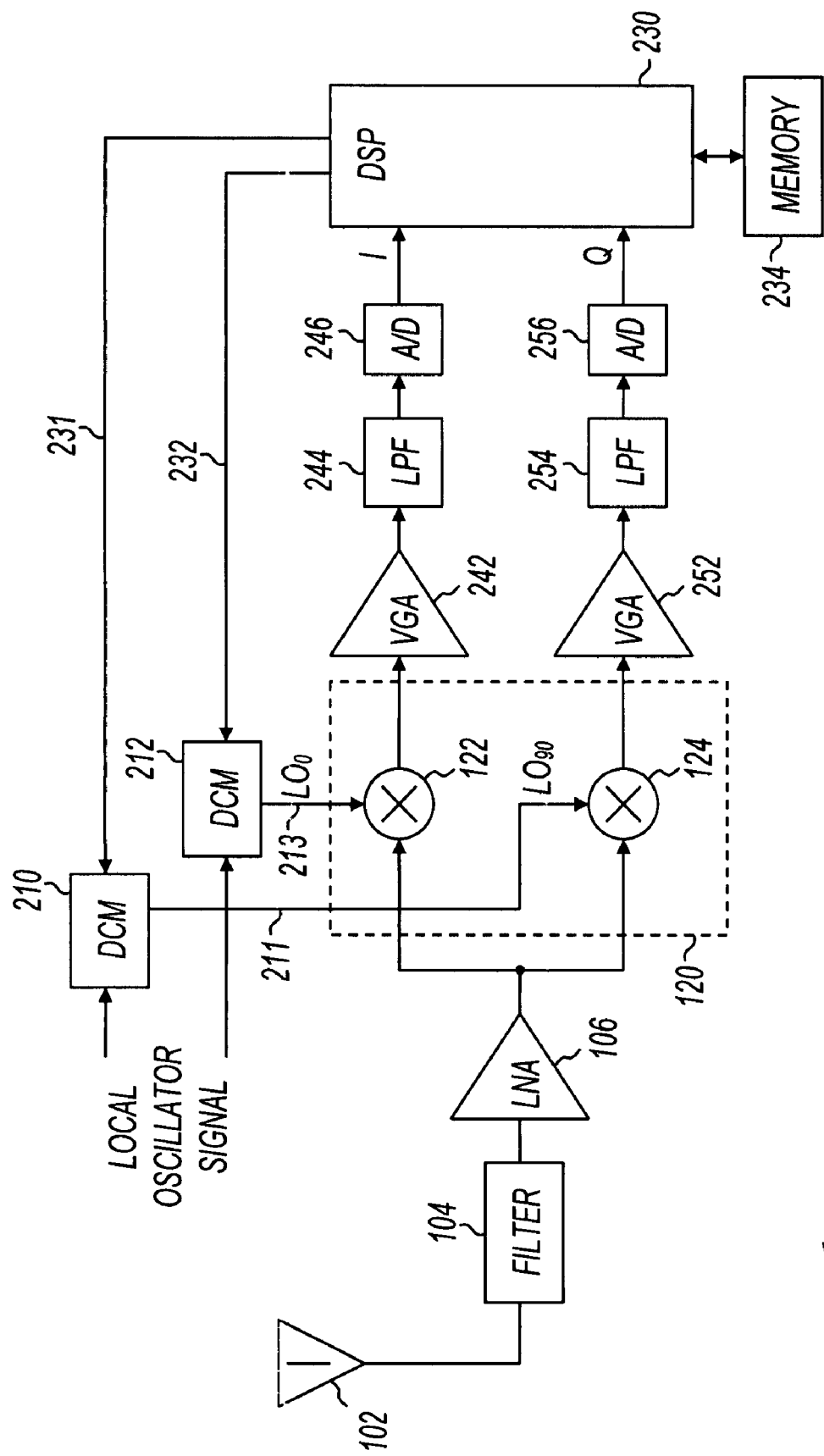

FIG. 2 shows a radio receiver in accordance with various embodiments of the present invention. Radio receiver 200 includes antenna 102, preselect filter 104, LNA 106, mixer circuit 120, variable gain amplifiers (VGA) 242 and 252, low pass filters (LPF) 244 and 254, analog-to-digital converters (A/D) 246 and 256, digital signal processor (DSP) 230, memory 234, and duty cycle modulation (DCM) circuits 210 and 212. Antenna 102, preselect filter 104, LNA 106, and mixer circuit 120 are described above with reference to FIG. 1.

VGA 242 receives an in-phase analog baseband signal from mixer 122, and VGA 252 receives a quadrature analog baseband signal from mixer 124. LPF 244 filters the output of VGA 242, and A/D 246 produces digitized in-phase (I) baseband samples. LPF 254 filters the output of VGA 252, and A/D 256 produces digitized quadrature (Q) baseband samples.

DSP 230 receives I and Q baseband signal samples, and performs further baseband processing. DSP 230 also determines a signal quality metric and influences the operation of DCM circuits 210 and 212. For example, DSP 230 may compute a signal-to-noise ratio (SNR) or signal-to-noise-plus-distortion ratio (SNDR). In response to the value of the quality metric, DSP 230 may change the value of control signals on nodes 231 and 232 to influence the operation of DCM circuits 210 and 212, respectively. DCM circuits 210 and 212 modify the duty cycle of LO signals, which are provided to mixer circuit 124 to downconvert received RF signals.

In some embodiments, mixer circuit 120 includes passive mixers. Performance of passive mixers may be improved by maintaining particular local oscillator (LO) voltage levels. In addition, performance of passive mixers may be improved when the quadrature-related LO signals have non-overlapping phases. For example, if the LO phases overlap, the noise figure (NF) is generally worse. In addition, if the overdrive voltage of the mixer transistors is small, the linearity is worse. Various embodiments of the present invention provide the ability to avoid LO overlap while still maintaining a large overdrive voltage. Avoiding LO overlap may provide a useful tradeoff between broadband noise, flicker noise, linearity (distortion), and gain.

In some embodiments, DSP 230 determines settings for control signals 231 and 232 at various stages of operation. For example, this may be a power-up calibration, or an on going update to compensate for aging, temperature variations, etc. Radio receiver 200 is shown having separate DCM circuits 210 and 212 for the two separate LO phases. In some embodiments, radio receiver 200 includes a single DCM circuit and a phase shifter such as that shown in FIG. 1.

Memory 234 represents an article that includes a machine readable medium. For example, memory 234 represents a random access memory (RAM), dynamic random access memory (DRAM), static random access memory (SRAM), read only memory (ROM), flash memory, diskette, hard disk, or any other type of article that includes a medium readable by DSP 230. Memory 234 may store instructions for performing the execution of the various method embodiments of the present invention.

Radio receivers, duty cycle modification circuits, mixer circuits, and other embodiments of the present invention can be implemented in many ways. In some embodiments, they are implemented in integrated circuits as part of electronic systems. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, portions of DCM circuit 110 (FIG. 1) may be represented as polygons assigned to layers of an integrated circuit.

Figure 3:
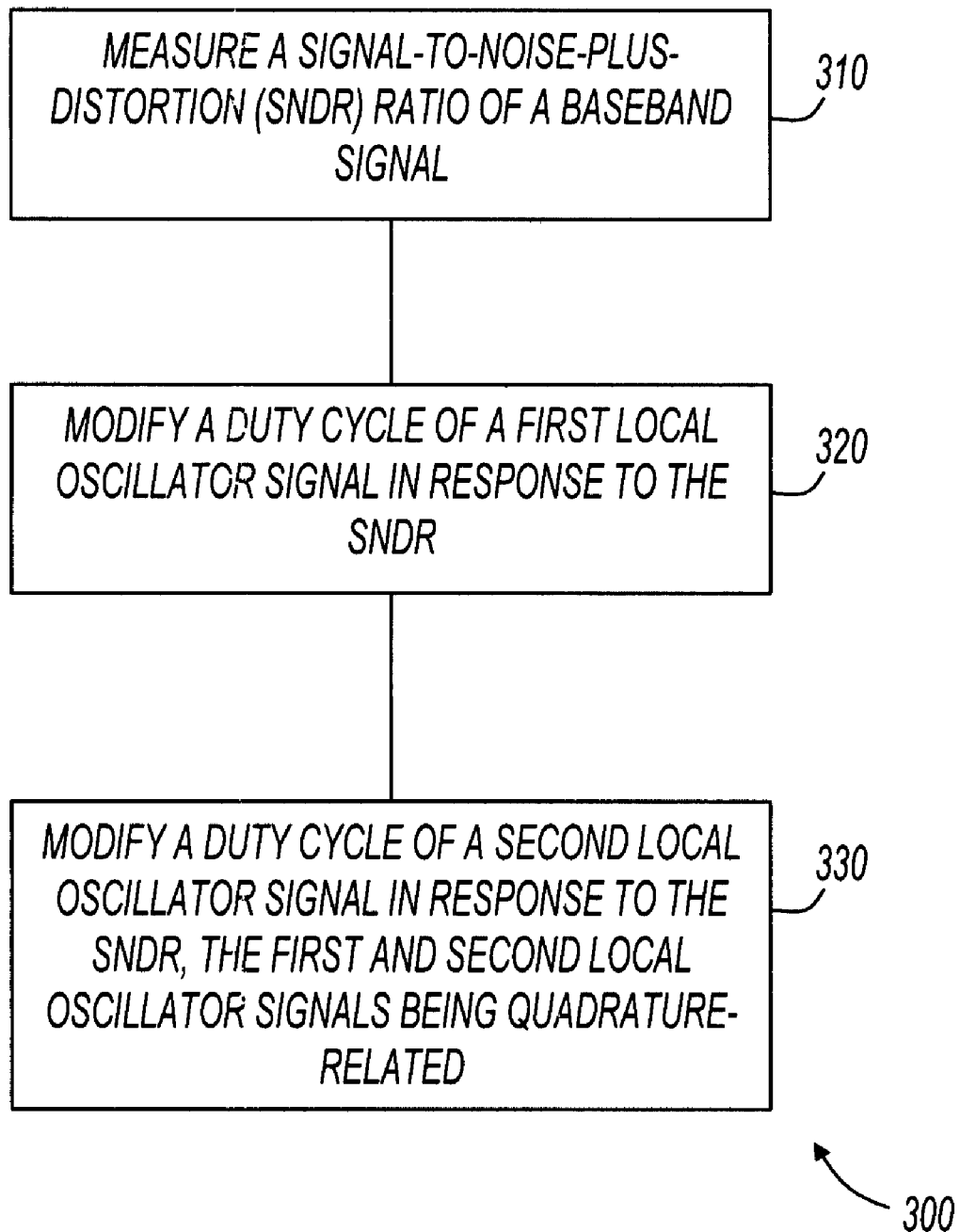
FIG. 3 shows a flowchart in accordance with various embodiments of the present invention.

FIG. 3 shows a flowchart in accordance with various embodiments of the present invention. In some embodiments, method 300, or portions thereof, is performed by a radio receiver, embodiments of which are shown in previous figures. In other embodiments, method 300 is performed by an integrated circuit or an electronic system. Method 300 is not limited by the particular type of apparatus or software performing the method. The various actions in method 300 may be performed in the order presented, or may be performed in a different order. Further, in some embodiments, some actions listed in FIG. 3 are omitted from method 300.

Method 300 is shown beginning with block 310 in which a signal-to-noise-plus-distortion ratio (SNDR) of a baseband signal is measured. In some embodiments, the actions of 310 are performed by baseband circuitry, such as baseband circuitry 130 (FIG. 1). Further, in some embodiments, the actions of 310 are performed by a digital signal processor such as DSP 230 (FIG. 2).

At 320, a duty cycle of a first local oscillator signal is modified in response to the SNDR. In some embodiments, the actions of 320 correspond to a duty cycle modification circuit such as DCM 110 (FIG. 1) or DCM 210 (FIG. 2) modifying the duty cycle of a signal in response to a control signal.

At 330, a duty cycle of a second local oscillator signal is modified in response to the SNDR, where the first and second local oscillator signals are quadrature-related. In some embodiments, the first and second local oscillator signals correspond to the LO signals on nodes 111 and 113 (FIG. 1). Further, in some embodiments, the first and second local oscillator signals correspond to LO signals on nodes 211 and 213 (FIG. 2).

In some embodiments, the duty cycle modification of the first and second local oscillator signals is performed to provide non-overlapping quadrature-related LO signals. For example, an in-phase LO signal and a quadrature LO signal may have their duty cycles modified such that the two LO signals are not asserted at the same time. Further, the amount of duty cycle modification may be dynamically altered based on a quality metric measured, where the SNDR is an example quality metric.

In some embodiments, the actions performed in method 300 are performed iteratively. For example, the duty cycles of local oscillator signals may be continually modified until the SNDR converges to a steady state value or until the SNDR crosses a threshold value.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A radio receiver comprising:
   a mixer circuit;
   a local oscillator duty cycle modification circuit coupled to provide a local oscillator signal to the mixer circuit; and a baseband circuit coupled to receive a baseband signal from the mixer circuit, and coupled to provide a control signal to the local oscillator duty cycle modification circuit.

2. The radio receiver of claim 1 wherein the baseband circuit comprises analog circuitry to provide the control signal.

3. The radio receiver of claim 2 wherein the control signal comprises an analog signal.

4. The radio receiver of claim 1 wherein the baseband circuit comprises digital circuitry to provide the control signal.

5. The radio receiver of claim 1 wherein the baseband circuit comprises a digital signal processor to provide the control signal.

6. The radio receiver of claim 5 wherein the digital signal processor measures a signal quality metric and produces the control signal in response to the signal quality metric.

7. The radio receiver of claim 6 wherein the signal quality metric comprises a signal-to-noise-plus-distortion ratio (SNDR) of the baseband signal.

8. The radio receiver of claim 5 wherein the local oscillator duty cycle modification circuit comprises:

a first circuit to modify a duty cycle of an in-phase local oscillator signal; and a second circuit to modify a duty cycle of a quadrature local oscillator signal.

9. The radio receiver of claim 1 further comprising an antenna coupled to provide radio frequency signals to the mixer circuit.

10. A method comprising:

measuring a signal-to-noise-plus-distortion ratio (SNDR) of a baseband signal; and modifying the duty cycle of a local oscillator signal in response to the SNDR of the baseband signal.

11. The method of claim 10 wherein modifying the duty cycle comprises modifying a duty cycle of two quadrature-related local oscillator signals.

12. The method of claim 11 wherein modifying the duty cycle of the two quadrature-related local oscillator signals comprises modifying an amount of overlap of the two quadrature-related local oscillator signals.

13. The method of claim 10 wherein measuring a SNDR comprises computing the SNDR with a digital signal processor.

14. The method of claim 13 wherein modifying the duty cycle of a local oscillator signal comprises providing a digital signal from the digital signal processor to a duty cycle modification circuit.

15. The method of claim 13 wherein modifying the duty cycle of a local oscillator signal comprises providing at least one digital signal from the digital signal processor to two duty cycle modification circuits to modify duty cycles of two quadrature-related local oscillator signals.

* * * * *